US006814886B1

(12) United States Patent
Anderson et al.

(10) Patent No.: US 6,814,886 B1
(45) Date of Patent: Nov. 9, 2004

(54) CRAFT AND AMUSEMENT COMPOSITION AND METHOD OF MAKING SAME

(75) Inventors: John Anderson, Powell, OH (US); Van R. Foster, Westerville, OH (US)

(73) Assignee: Elmer's Product, Inc., Columbus, OH (US)

( * ) Notice: Subject to any disclaimer, the term of this patent is extended or adjusted under 35 U.S.C. 154(b) by 0 days.

(21) Appl. No.: 10/424,473

(22) Filed: Apr. 28, 2003

(51) Int. Cl.[7] .......................... C09K 3/00; B05C 17/12; B44D 3/04; B44D 3/08; B44D 3/12

(52) U.S. Cl. ............................ 252/182.18; 252/182.29; 252/182.32; 206/1.7; 206/1.8; 206/1.9; 106/160.1

(58) Field of Search ........................... 206/1.7, 1.8, 1.9, 206/81, 813; 252/182.18, 182.29, 182.32; 106/160.1

(56) References Cited

U.S. PATENT DOCUMENTS 4,968,771 A * 11/1990 Baxter ........................ 528/230
5,198,166 A * 3/1993 Bordelon ..................... 264/73
5,208,100 A * 5/1993 Rush .......................... 428/332
5,416,140 A * 5/1995 Columbus et al. ............ 524/13
6,004,121 A * 12/1999 Gupta ......................... 425/87
6,531,009 B1 * 3/2003 Prior ........................... 156/63
6,634,289 B2 * 10/2003 Foster et al. ............. 101/128.4
2003/0017260 A1 * 1/2003 Pendergrass

* cited by examiner

*Primary Examiner*—Joseph D. Anthony
(74) *Attorney, Agent, or Firm*—McNees Wallace & Nurick LLC

(57) ABSTRACT

In broadest terms, a craft composition and a craft composition kit, the composition comprising: a first component in a first container and comprising a first solution of polyvinyl acetate and polyvinyl alcohol and a first colorant, a second component in a second container and comprising a second solution of a tetraborate composition in a second colorant, the first and second components being adapted to present an appearance of striated colors upon initial admixture, which appearance transforms to a uniform single color resulting from the uniform mixture of the first and second colorants. The invention also includes a method of preparing a craft composition.

10 Claims, No Drawings

CRAFT AND AMUSEMENT COMPOSITION AND METHOD OF MAKING SAME

TECHNICAL FIELD OF THE INVENTION

The present invention is directed toward compositions having unique and amusing or educational properties, and methods of making them.

BACKGROUND OF THE INVENTION

There continues to be a need for compositions in the market that offer the consumer educational or amusing qualities in a composition that is safe and convenient to handle.

One of the educational or amusing qualities in such substances is an unusual texture or viscosity associated with colloidal or colloid-like substances. Substances of this type are particularly amusing for children and adults alike because such textures and consistencies are not commonly encountered whereas most substances are dimensionally stable solids, or liquids.

Further, it is also desirable to produce an educational or amusement substance that can be produced from the mixture of two or more compositions that are of a noticeably different physical character, such as a light or vicous liquid, than that of the final product. This offers the user an additional educational or amusing experience in terms of allowing the user to experience the reaction and transformation of two or more materials to a final material of a completely and unexpectedly different nature.

Another beneficial educational or amusing characteristic of this type is to have the constituent material once mixed also bring about a color change in the final material which is different than the color of either of the constituent materials. The color change adds to the overall educational or amusing experience in the use of these materials as the final material changes in both texture and color.

Another concern in the use of these educational or amusing materials is that the user be able to determine when the reaction between the constituent materials has proceeded to near completion such that the final product may be handled safely without remaining unreacted low viscosity reactant materials escaping from the mixture, such as by escaping the the grasp of the user if the user attempts to handle the product before the reaction of the constituent materials has proceeded to completion.

One of the concerns in the production of these constituent materials is that color-bearing constituent materials that are of low viscosity may escape from the unreacted components prior to complete formation of the final craft product. Accordingly, it is also advantageous to have constituents that provide a visual indication that the formation reaction has proceeded to completion.

SUMMARY OF THE INVENTION

The present invention overcomes many of the disadvantages of prior art.

In broadest terms, the present invention includes a craft composition and a craft composition kit, the composition comprising: a first component in a first container and comprising a first solution of polyvinyl acetate and polyvinyl alcohol and a first colorant, a second component in a second container and comprising a second solution of a tetraborate composition and a second colorant, the first and second components being adapted to present an appearance of striated colors upon initial admixture, which appearance transforms to a uniform single color resulting from the uniform mixture of the first and second colorants. The invention also includes a method of preparing a craft composition.

It is preferred that the polyvinyl acetate and polyvinyl alcohol solution be present in an amount equivalent to mixing white school glue with water, in the range of from about 30% to about 60% by weight.

In the second component, it is preferred that the tetraborate composition comprises sodium tetraborate decahydrate. It is also preferred that the tetraborate composition comprises a tetraborate present in an amount in the range of 2% to 10% by weight and preferably 4% by weight.

Optionally, the craft composition kit may further comprise an effective amount of any one of the following: (a) at least one biocide; (b) at least one thickener; (c) at least one fragrance; and/or (d) at least one additional colorant in addition to those required (which may be part of the individual components, or separately packaged and supplied to the mixture after mixing).

In general, the method for preparing a craft composition of the present invention comprises the steps of:

(a) providing (1) a first component in a first container and comprising a first solution of polyvinyl acetate and polyvinyl alcohol and a first colorant, and (2) a second component in a second container and comprising a second solution of a tetraborate composition and a second colorant (different in color from the first colorant), the first and second components being adapted to present an appearance of striated colors upon initial admixture, which appearance transforms to a uniform single color resulting from the uniform mixture of the first and second colorants;

(b) admixing the first and second component so as to form a mixture to present an appearance of striated colors upon initial admixture; and (c) allowing the mixture to further homogenize so as to transform the mixture to a uniform single color resulting from the uniform mixture of the first and second colorants.

Preferably, the method of the present invention further includes further mixing the mixture during step (c) so as to expedite the homogenization during step (c).

It is preferred that the craft composition of the present invention additionally comprises at least one biocide. Although a functional amount of biocide should be used in the present invention, it is preferred that the biocide(s) constitute(s) from about 0.05 to about 0.15 weight percent of the completed craft composition. It is most preferred that the at least one biocide is ACTICIDE LA sold by Actichem.

Craft compositions of the present invention may additionally comprise at least one thickener or stabilizer, such as Texipol 63-508 (Scott Bader) to retard settling of resin solids, typically present in an amount of about 1.5–2.0 weight percent of the first component.

In addition to the novel features and advantages mentioned above, other objects and advantages of the present invention will be readily apparent from the following description of the preferred embodiment(s).

DETAILED DESCRIPTION OF THE PREFERRED EMBODIMENT(S)

In accordance with the foregoing summary, the following presents a detailed description of the preferred embodiment of the invention that is currently considered to be the best mode.

The present invention is directed towards a craft composition and method of making the craft composition.

Preferred compositions for the two constituent compositions of the present invention comprises, on a weight percent basis, are as follows:

| Item No. | Ingredients | % by Weight |
|---|---|---|
| | The First Component | |
| 1 | Elmer's School Glue | 48.8–49.05 |
| 2 | Water | 48.8–49.05 |
| 3 | ACTICIDE LA | 0.1 |
| 4 | Milliken Palmer Yellow R | 0.3 |
| | Texipol 63-508 (Scott Bader) | 1.5–2.0 |
| | TOTAL: | 100.00 |
| | The Second Component | |
| 1 | Water | 94.30 |
| 2 | ACTICIDE LA | 0.05 |
| 3 | FD&C Blue #1 (2% aqueous solution) | 1.50 |
| 4 | Borax-Sodium Tetraborate Decahydrate (commercially available from U.S. Borax) | 4.00 |
| | TOTAL: | 100.00 |

Another preferred composition for the two constituent compositions of the present invention comprises, on a weight percent basis, are as follows:

| Item No. | Ingredients | % by Weight |
|---|---|---|
| | The First Component | |
| 1 | Elmer's School Glue | 33.55–33.75 |
| 2 | Water | 64.05–64.35 |
| 3 | ACTICIDE LA | 0.1 |
| 4 | Milliken Palmer Yellow R | 0.3 |
| | Texipol 63-508 (Scott Bader) | 1.5–2.0 |
| | TOTAL: | 100.00 |
| | The Second Component | |
| 1 | Water | 94.30 |
| 2 | ACTICIDE LA | 0.05 |
| 3 | FD&C Blue #1 (2% aqueous solution) | 1.50 |
| 4 | Borax-Sodium Tetraborate Decahydrate (commercially available from U.S. Borax) | 4.00 |
| | TOTAL: | 100.00 |

| Item No. | Ingredients | % by Weight |
|---|---|---|
| | The First Component | |
| 1 | Elmer's School Glue | 43.50 |
| 2 | Water | 54.70 |
| 3 | ACTICIDE LA | 0.1 |
| 4 | Milliken Palmer Yellow R | 0.3 |
| | Texipol 63-508 (Scott Bader) | 1.4 |
| | TOTAL: | 100.00 |
| | The Second Component | |
| 1 | Water | 94.30 |
| 2 | ACTICIDE LA | 0.05 |
| 3 | FD&C Blue #1 | 1.50 |

-continued

| Item No. | Ingredients | % by Weight |
|---|---|---|
| | (2% aqueous solution) | |
| 4 | Borax-Sodium Tetraborate Decahydrate (commercially available from U.S. Borax) | 4.00 |
| | TOTAL: | 100.00 |

The following describes a preferred methodology for compounding the preferred craft composition described above, with reference to the item numbers used above.

For the first component:

1. To a clean, dry tank provided with a mixer, add item (1)
2. Start the mixer and under moderate mixing, slowly add item (2), mixing until a homogeneous mixture is obtained.
3. Add items (3) and (4), mixing until color is uniform throughout.
4. Under high speed mixing, add item (5) and continue mixing until mixture has increased in viscosity (consistency) and is smooth and homogenous.
5. Stop mixing and obtain sample. Check color. The first component may be tested by making the craft material using finished second component, as described below.

For the second component:

1. To a clean, dry tank provided with a mixer, add item (1). Maintain temperature at about 25–30 degrees C.
2. Start the mixer and under moderate mixing, slowly add item (2), mixing until a homogeneous mixture is obtained.
3. Add item (3) to batch, mixing until color is uniform throughout.

Continue mixing, slowly add item (4). Lumps should be broken up before adding for easier dissolution.

After mixing (about 10 to 20 minutes), shut down mixer to allow undissolved solids, if any, to settle on tank bottom. Draw off portion, decant off liquid back into the tank and dispose of remaining undissolved solids by flushing down drain. In an alternate procedure, a fine filter may be used to remove undissolved solids. Remove sample and check for color and clarity. The second component may be tested by making the craft material using finished first component, as described below.

The first and second craft components may then be dispensed into smaller containers as desired for packaging and shipment as kits, such as through the use of commercial filling equipment. The containers for the first and second craft components may be of sufficient size to be able to act as mixing containers for the collective volume of the first and second component. For example, the components, about 90 grams, may be packaged in 6-ounce plastic jars and combined into a kit for distribution and sale. The composition may be made by first lightly shaking the container holding the first component, combining the second component in that container, capping the container and shaking vigorously for about 30 seconds. After the composition has become solidified (which is indicated as described herein), it may be removed from the container and further kneaded.

In order to use the craft material the finished first and second components are admixed between and using their own containers. This may be done by combining the components in a single container and shaking vigorously for about 30 seconds.

The initial admixture of the two components does not uniformly mix initially, but takes on a striated appearance, the striations being of the colors of the respective two individual components. This appearance persists through initial mixing, indicating to the user that the reaction between the components is not yet complete, and that it is not yet time for the craft material to be taken from its container. This is particularly important for juvenile users as an easy-to-understand indicator that tells the user when the craft material may be safely and cleanly used and enjoyed. In this regard, the borate component is typically much less viscous, and may escape the grasp of the user if the mixture is removed from the container too soon.

The craft material eventually becomes homogeneous in texture and color either through additional mixing, or through the passage of time (typically hours) after initial mixing.

The craft material may then be taken from the mixing vessel(s) and used and enjoyed.

While the invention has been described in connection with what is presently considered to be the most practical and preferred embodiments, it is to be understood that the invention is not to be limited to the disclosed embodiment (s), but on the contrary, is intended to cover various modifications and equivalent arrangements included within the spirit and scope of the appended claims, which are incorporated herein by reference.

What is claimed is:

1. A craft composition kit, said composition comprising:

(a) a first component in a first container and comprising a first aqueous solution of polyvinyl acetate and polyvinyl alcohol and a first colorant; said polyvinyl acetate and polyvinyl alcohol is present in an amount in the range of from about 30% to about 60% by weight of said first aqueous solution; and (b) a second component in a second container and comprising a second aqueous solution of a tetraborate composition and a second colorant, said tetraborate composition comprising tetraborate present in the range of 2% to 10% by weight of said second aqueous solution;

said first and second components being adapted to present an appearance of striated colors upon initial admixture, which appearance transforms to a uniform single color resulting from the uniform mixture of said first and second colorants.

2. The craft composition kit according to claim 1 wherein said tetraborate composition comprises sodium tetraborate decahydrate.

3. The craft composition kit according to claim 2 wherein said tetraborate composition comprises a tetraborate present in an amount in the range of 3% to 4% by weight of said sodium tetraborate decahydrate.

4. The craft composition kit according to claim 2 wherein said tetraborate composition comprises a tetraborate present in an amount of 4% by weight of said sodium tetraborate decahydrate.

5. The craft composition kit according to claim 1 further comprising at least one biocide beyond said first and second components.

6. The craft composition kit according to claim 1 further comprising at least one additional colorant.

7. The craft composition kit according to claim 1 further comprising at least one thickener beyond said first and second components.

8. The craft composition kit according to claim 1 further comprising at least one pigment fragrance.

9. A craft composition kit, said composition comprising:

(a) a first component in a first container and comprising a first aqueous solution of polyvinyl acetate and polyvinyl alcohol and a first colorant; said polyvinyl acetate and polyvinyl alcohol is present in an amount in the range of from about 30% to about 60% by weight of said first aqueous solution; and (b) a second component in a second container and comprising a second aqueous solution of a tetraborate composition and a second colorant, said tetraborate composition comprising sodium tetraborate decahydrate present in an amount of 4% by weight of said second aqueous solution;

said first and second components being adapted to present an appearance of striated colors upon initial admixture, which appearance transforms to a uniform single color resulting from the uniform mixture of said first and second colorants.

10. The craft composition kit according to claim 9 wherein said first and second containers for said first and second craft components are of sufficient size to be able to act as mixing containers for the collective volume of said first and second component.

* * * * *